United States Patent
Zaum et al.

(10) Patent No.: US 9,796,143 B2
(45) Date of Patent: Oct. 24, 2017

(54) DEVICE FOR SEALING AND INFLATING INFLATABLE OBJECTS

(71) Applicant: Continental Reifen Deutschland GmbH, Hannover (DE)

(72) Inventors: Christopher Zaum, Seelze (DE); Rainer Detering, Neustadt am Rbge (DE)

(73) Assignee: Continental Reifen Deutschland GmbH, Hannover (DE)

( * ) Notice: Subject to any disclaimer, the term of this patent is extended or adjusted under 35 U.S.C. 154(b) by 0 days.

(21) Appl. No.: 15/125,970

(22) PCT Filed: Jan. 16, 2015

(86) PCT No.: PCT/EP2015/050724
§ 371 (c)(1),
(2) Date: Sep. 14, 2016

(87) PCT Pub. No.: WO2015/139856
PCT Pub. Date: Sep. 24, 2015

(65) Prior Publication Data
US 2017/0072648 A1    Mar. 16, 2017

(30) Foreign Application Priority Data

Mar. 19, 2014   (DE) .................. 10 2014 205 067

(51) Int. Cl.
*B65B 31/00* (2006.01)
*B29C 73/16* (2006.01)
(Continued)

(52) U.S. Cl.
CPC ............ *B29C 73/166* (2013.01); *F04B 35/06* (2013.01); *F04B 49/16* (2013.01); *B29L 2030/00* (2013.01); *F04B 35/04* (2013.01)

(58) Field of Classification Search
CPC ... B29C 73/025; B29C 73/166; B29C 29/062; B65D 5/50; B65D 25/20
See application file for complete search history.

(56) References Cited

U.S. PATENT DOCUMENTS

| | | | |
|---|---|---|---|
| 2010/0040484 A1 | 2/2010 | Shade | |
| 2011/0011217 A1* | 1/2011 | Kojima | B29C 73/166 81/15.2 |
| 2013/0000777 A1* | 1/2013 | Kojima | B29C 73/166 141/38 |

FOREIGN PATENT DOCUMENTS

| | | |
|---|---|---|
| EP | 2058112 A1 | 5/2009 |
| EP | 2396165 A1 | 12/2011 |

(Continued)

OTHER PUBLICATIONS

PCT/EP2015/050724 The International Search Report and the Written Opinion of the International Searching Authority dated Apr. 23, 2015.

*Primary Examiner* — Jason K Niesz
(74) *Attorney, Agent, or Firm* — David L. Cate

(57) ABSTRACT

Devices for sealing and inflating inflatable objects, wherein the device has as a source of compressed gas a compressor unit, which is formed as a reciprocating piston compressor driven by a slider crank mechanism and has a piston moved in an oscillating manner in a cylinder, wherein the piston and the cylinder delimit a compression chamber and the cylinder is closed on the output side by a cylinder head with an outlet valve, wherein the device also has a reservoir for an automatic sealant that can be filled into the inflatable object and a valve-and-distributor unit for sealant and compressed gas, which connects the reservoir and the compressor unit and has a line that can be connected to the inflatable object, (Continued)

wherein the valve-and-distributor unit allows the device to be operated according to choice in the two operating modes "inflate" and "feed sealant".

20 Claims, 2 Drawing Sheets

(51) Int. Cl.
*F04B 49/16* (2006.01)
*F04B 35/06* (2006.01)
*B29L 30/00* (2006.01)
*F04B 35/04* (2006.01)

(56) References Cited

FOREIGN PATENT DOCUMENTS

| | | | |
|---|---|---|---|
| EP | 2497628 | A1 | 9/2012 |
| EP | 2657007 | A | 10/2013 |
| EP | 2657007 | A1 | 10/2013 |
| JP | H08144038 | A | 6/1996 |
| JP | 2008126580 | A | 6/2008 |
| JP | 2009269322 | A | 11/2009 |
| JP | 2010018005 | A | 1/2010 |
| JP | 2012101373 | A | 5/2012 |
| JP | 2012157974 | A | 8/2012 |
| JP | 2016525180 | A | 8/2016 |
| WO | 2012163618 | A | 12/2012 |

* cited by examiner

DEVICE FOR SEALING AND INFLATING INFLATABLE OBJECTS

CROSS REFERENCE TO RELATED APPLICATIONS

This application is a continuation application of international patent application PCT/EP2015/050724, filed Jan. 16, 2015, designating the United States and claiming priority from German patent application 10 2014 205 067.7, filed Mar. 19, 2014, and the entire content of these applications is incorporated herein by reference.

FIELD

The invention relates to a device for sealing and inflating inflatable objects, in particular for sealing and inflating motor vehicle tires.

BACKGROUND

This section provides background information to facilitate a better understanding of the various aspects of the disclosure. It should be understood that the statements in this section of this document are to be read in this light, and not as admissions of prior art.

Devices for sealing and inflating inflatable objects are required in particular for puncture repair kits, which are arranged in the motor vehicle and carried by it in place of a spare tire.

In the case of such puncture repair kits for the temporary repair of tire punctures, in which the compressor units, i.e. the air compressors for filling a damaged tire, usually by way of a valve-and-distributor unit for sealant and compressed gas, are connected to the tire to be repaired, the valve-and-distributor unit also has a connector for the connection of a sealant container. For sealing the damaged tire, the sealant is then fed by the air compressor into the tire by way of the valve-and-distributor unit and after that the tire is inflated by the air compressor up to a certain minimum pressure.

The actual sealing of the damaged tire then takes place when the journey is resumed with the re-filled tire. The positive pressure on the tire and the outwardly acting centrifugal forces have the effect that the tire sealant is forced into the place where the tire is damaged (for example a puncture hole). The high shear forces and increased temperatures occurring here have the effect of initiating a chemical process in the tire sealant, which finally leads to a solidification of the sealant and a temporary sealing of the place that is damaged.

During the previously carried out process of feeding the sealant into the tire that is described above, the tire sealant is forced through the opened tire valve. The opening cross section present here corresponds approximately to the cross section of typical tire damage, and therefore certain measures are necessary to prevent the tire sealant from already solidifying and sealing in the tire valve. Apart from a chemical adaptation of the tire sealant, particularly the physical boundary conditions during the feeding of the sealant must also be chosen so as to prevent solidification of the tire sealant in the tire valve.

A high volumetric flow during the feeding of the sealant leads to high shear forces in the tire valve. In order to prevent resultant solidifying of the tire sealant, and therefore avoid clogging of the tire valve with sealant during the filling, the volumetric flow, and consequently the capacity of the air compressor used, may be limited. As a side effect, the air temperature at the compressor output is also reduced as a result. The consequently reduced heating up of the tire sealant likewise reduces its tendency to solidify. However, this approach has the disadvantage that less pumping power is available for the later inflation of the tire, against the leakage that is present, and consequently it is only possible to seal temporarily relatively minor damage to the tire.

An alternative to the described reduction of the volumetric flow is for example that of removing the tire valve during the filling with sealant. A complete removal of the tire valve during the pumping of the sealant dependably prevents a blockage of this constriction. This has the disadvantage, however, that the sealing process as such becomes much more complicated and laborious for the user.

A pressure-limiting solution of a more general nature is shown for example by DE 44 29 097 A1. Disclosed there is a compressor unit or a piston compressor with an outlet valve of a conventional type in the prior art, which at the same time is the only "pressure relief valve" for the interior space of the compressor. Such an outlet valve consists of a spring-loaded disk, which covers an outlet bore of the compression space in the cylinder and lifts off against the spring when there is corresponding pressure in the compression space. However, this does not address the risk referred to of the tire valve clogging with sealant during filling.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Some embodiments according to the disclosure are devices for sealing and inflating inflatable objects. Such devices include a source of compressed gas, and a compressor unit, which is formed as a reciprocating piston compressor driven by a slider crank mechanism and has a piston moved in an oscillating manner in a cylinder, wherein the piston and the cylinder delimit a compression chamber and the cylinder is closed on the output side by a cylinder head with an outlet valve. The devices further include a pressure gage, a reservoir for an automatic sealant that can be filled into an inflatable object, and a valve-and-distributor unit for the sealant and the compressed gas, which connects the reservoir and the compressor unit and comprises a line that can be connected to the inflatable object, wherein the valve-and-distributor unit allows the device to be operated according to choice in the two operating modes "inflate" and "feed sealant". The reciprocating piston compressor is provided with a variable dead air volume, the content of which can be varied depending on the respective operating mode.

In some aspects, content of the dead air volume can be varied depending on the different pressure that is respectively produced by the two operating modes in the compression chamber. The dead air volume may also be provided by a pressure chamber which is connected to the compression chamber and the content of which can be varied by the different pressure that is respectively produced by the two operating modes in the compression chamber. Furthermore, the content of the further pressure chamber can be varied against spring force, the spring force preferably being adjustable, and the further pressure chamber may even take the form of a second cylinder, as a guided displaceably movable piston slide valve which is acted upon by a spring.

In some cases, the content of the dead air volume or pressure chamber can be increased to at least 5% of the compression chamber.

In some embodiments, the compressed gas flows from the compression chamber into the pressure chamber in a damped manner, and in particular flows through a pneumatic restrictor. The damping may be produced by the piston slide valve being frictionally displaced in the second cylinder, in particular by the piston slide valve being formed with sealing rings that are arranged between the inner wall of the second cylinder and the outer circumference of the piston slide valve and produce a frictional damping during the displacement. In some aspects, the damping is performed such that the maximum movement frequency of the piston slide valve is below the stroke frequency of the piston.

Other embodiments according to the disclosure are devices for sealing and inflating motor vehicle tires, which include a source of compressed gas, and a compressor unit, which is formed as a reciprocating piston compressor driven by a slider crank mechanism and has a piston moved in an oscillating manner in a cylinder, wherein the piston and the cylinder delimit a compression chamber and the cylinder is closed on the output side by a cylinder head with an outlet valve. The devices further include a pressure gage, a reservoir for an automatic sealant that can be filled into an inflatable object, and a valve-and-distributor unit for the sealant and the compressed gas, which connects the reservoir and the compressor unit and comprises a line that can be connected to the inflatable object, wherein the valve-and-distributor unit allows the device to be operated according to choice in the two operating modes "inflate" and "feed sealant". In some aspects, the reciprocating piston compressor is provided with a variable dead air volume, the content of which can be varied depending on the respective operating mode.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and.

DETAILED DESCRIPTION

Figure 1:
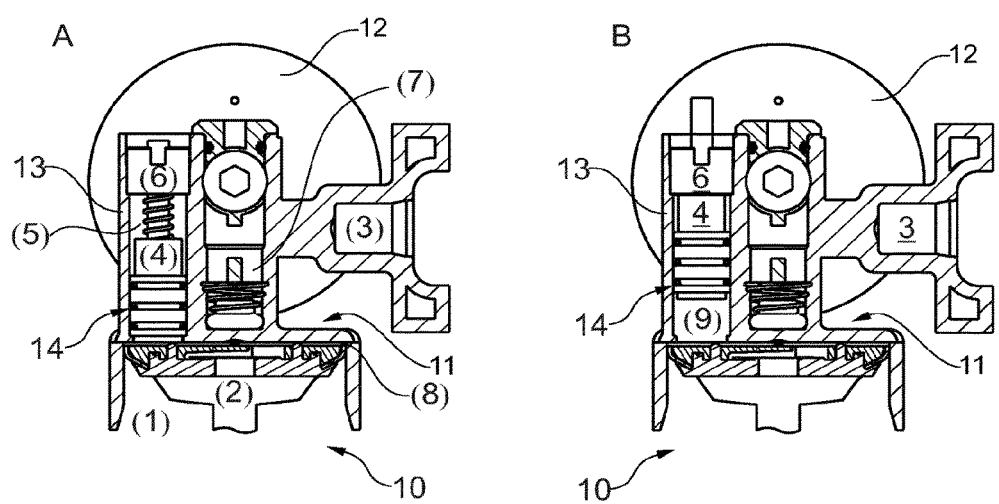
FIG. 1 shows representations of details of a device according to the disclosure for sealing and inflating inflatable objects; and, FIG. 2 shows diagrams for a comparison of the operating modes/operating states "inflate" and "feed sealant", in accordance with the disclosure.

The following description of the variations is merely illustrative in nature and is in no way intended to limit the scope of the disclosure, its application, or uses. The description and examples are presented herein solely for the purpose of illustrating the various embodiments of the disclosure and should not be construed as a limitation to the scope and applicability of the disclosure.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of concepts according to the disclosure. This description should be read to include one or at least one and the singular also includes the plural unless otherwise stated.

The terminology and phraseology used herein is for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited.

Also, as used herein any references to "one embodiment" or "an embodiment" means that a particular element, feature, structure, or characteristic described in connection with the embodiment is included in at least one embodiment. The appearances of the phrase "in one embodiment" in various places in the specification are not necessarily referring to the same embodiment.

Embodiments according to the disclosure are devices for sealing and inflating inflatable objects in which undesired solidification of the tire sealant during the filling with sealant, for example in a valve, in a tire valve or in supply lines to the inflatable object, is prevented.

In some embodiments, the devices for sealing and inflating inflatable objects, such as for sealing and inflating motor vehicle tires, have a source of compressed gas a compressor unit, which is formed as a reciprocating piston compressor driven by a slider crank mechanism and has a piston moved in an oscillating manner in a cylinder, where the piston and the cylinder delimit a compression chamber and the cylinder is closed on the output side by a cylinder head with an outlet valve. The device also has a reservoir for an automatic sealant that can be filled into the inflatable object and a valve-and-distributor unit for sealant and compressed gas, which connects the reservoir and the compressor unit and has a line that can be connected to the inflatable object. The valve-and-distributor unit allows the device to be operated according to choice in the two operating modes "inflate" and "feed sealant". The reciprocating piston compressor may be provided with a variable dead air volume, the content of which can be varied and/or can be activated depending on the respective operating mode "inflate" and "feed sealant".

Configurations according to the disclosure make possible reduction in the volumetric flow and air temperature during the feeding of the tire sealant without reducing the pumping power for the filling of the tire with air. This control task is accomplished by a simple mechanical construction, and consequently the production costs in comparison with typical air compressors are only slightly increased. With the aid of embodiments of the disclosure, the capacity of sealant compressors can be increased without restricting the transportability of the fed sealant. The increase in the costs per unit as a result of the necessary control is very low in comparison with a typical sealant compressor.

An advantageous aspect is that the content of the dead air volume can be varied depending on the different pressure that is respectively produced by the two operating modes in the compression chamber and in the outlet line of the compressor. The pressure is therefore suitable as an initial variable since, due to the high viscosity of the sealant to be fed, the pressure in the compression chamber/in the cylinder head is significantly increased in the "feed sealant" operating mode, i.e. in the operating mode in which sealant is fed, as compared with the "inflate" operating mode. The pressure in the compression chamber or in the air outlet therefore increases.

Among the ways in which the control of the dead air volume may then take place is for example electronically, for instance with the aid of a pressure sensor, an electronic control element, or else by an electromechanical actuator. The control of the dead air volume may also be performed by a central monitoring unit in dependence on the momentary operating state of the air compressor that is determined by the central monitoring unit.

A further advantageous configuration is that the dead air volume is provided by a pressure chamber which is connected to the compression chamber and the content of which can be varied by the different pressure that is respectively produced by the two operating modes in the compression chamber. This allows the dead air volume to be set independently of the form and configuration of the compression chamber.

A further advantageous configuration is that the content of the further pressure chamber can be varied or activated against spring force, the spring force preferably being adjustable. This produces a structurally very simple solution. The same applies to a further advantageous configuration, which is that the further pressure chamber takes the form of a second cylinder, arranged in which is a guided displaceably movable piston slide valve, which is acted upon by a spring.

A further advantageous configuration is that the content of the dead air volume or pressure chamber can be increased to at least 5% of the compression chamber or compression volume. With a variable dead air volume of 10% of the compression volume, the volumetric flow can be reduced by up to 40% and the air temperature can be reduced by up to 70%, which of course also contributes to the often desired thermal relief of the cylinder head. The electrical power consumption of the compressor with the dead air volume activated also decreases by up to 30%.

A further advantageous configuration is that the compressed gas flows from the compression chamber into the pressure chamber, i.e. into the dead air volume, in a damped manner, in particular flows through a pneumatic restrictor. This also allows pressure peaks from the cylinder forming the compression chamber to be damped.

A further advantageous configuration is that the damping is produced by the piston slide valve being frictionally displaced in the second cylinder, in particular by the piston slide valve being formed with sealing rings that are arranged between the inner wall of the second cylinder and the outer circumference of the piston slide valve and produce a frictional damping during the displacement. In this way it can be easily avoided that the activation of the dead air volume comes close to the stroke frequency of the piston. This is advantageous since the desired effect of the "activated" dead air volume is at a maximum when its content is approximately constant during the entire piston stroke.

A further advantageous configuration is that the damping is performed such that the maximum movement frequency of the piston slide valve is below the stroke frequency of the piston. This design prevents an uncontrolled oscillation of the system as a whole.

FIG. 1 shows representations of details of a device for sealing and inflating inflatable objects, in particular for sealing and inflating motor vehicle tires, in accordance with some aspects of the disclosure. The device is shown in two switching states A and B, on the one hand with a non-activated dead air volume (A) on the left-hand side of FIG. 1 and on the other hand with an activated dead air volume (B) on the right-hand side of FIG. 1.

The device has as a source of compressed gas a compressor unit, which is formed as a reciprocating piston compressor 10 driven by a slider crank mechanism and has a piston 2 moved in an oscillating manner in a cylinder 1, wherein the piston 2 and the cylinder 1 delimit a compression chamber and the cylinder 1 is closed on the output side by a cylinder head 11 with an outlet valve 7.

The device also has a pressure gage 12 and a reservoir (not represented any more specifically here) for an automatic sealant that can be filled into the inflatable object and a valve-and-distributor unit for sealant and compressed gas, which connects the reservoir and the compressor unit and has a line that can be connected to the inflatable object, wherein the valve-and-distributor unit allows the device to be operated according to choice in the two operating modes "inflate" and "feed sealant". The valve-and-distributor unit is usually connected to the air outlet 3 and is likewise not represented any more specifically in FIG. 1.

The reciprocating piston compressor 10 is provided with a variable dead air volume, the content of which can be varied depending on the respective operating mode, to be specific depending on the different pressure that is respectively produced by the two operating modes "inflate" and "feed sealant" in the compression chamber. In the embodiment shown, the variable dead air volume is provided by an additional chamber, to be specific by a pressure chamber 9 which is connected to the compression chamber and the content of which can be varied or activated by the different pressure that is respectively produced by the two operating modes in the compression chamber.

The content of the pressure chamber 9 can be varied against an adjustable spring force, wherein the pressure chamber 9 takes the form of a second cylinder 13, arranged in which is a guided displaceably movable piston slide valve 4, which is acted upon by the spring 5. The adjusting or biasing of the spring 5 is performed by means of the adjusting device 6.

In the embodiment shown here, the content of the dead air volume or pressure chamber 9 can be increased to a size/a volume of at least 10% of the compression chamber or compression volume.

The present embodiment of the subject matter according to the disclosure therefore controls the volumetric flow of the air compressor by a variable, activatable dead air volume.

Figure 2:
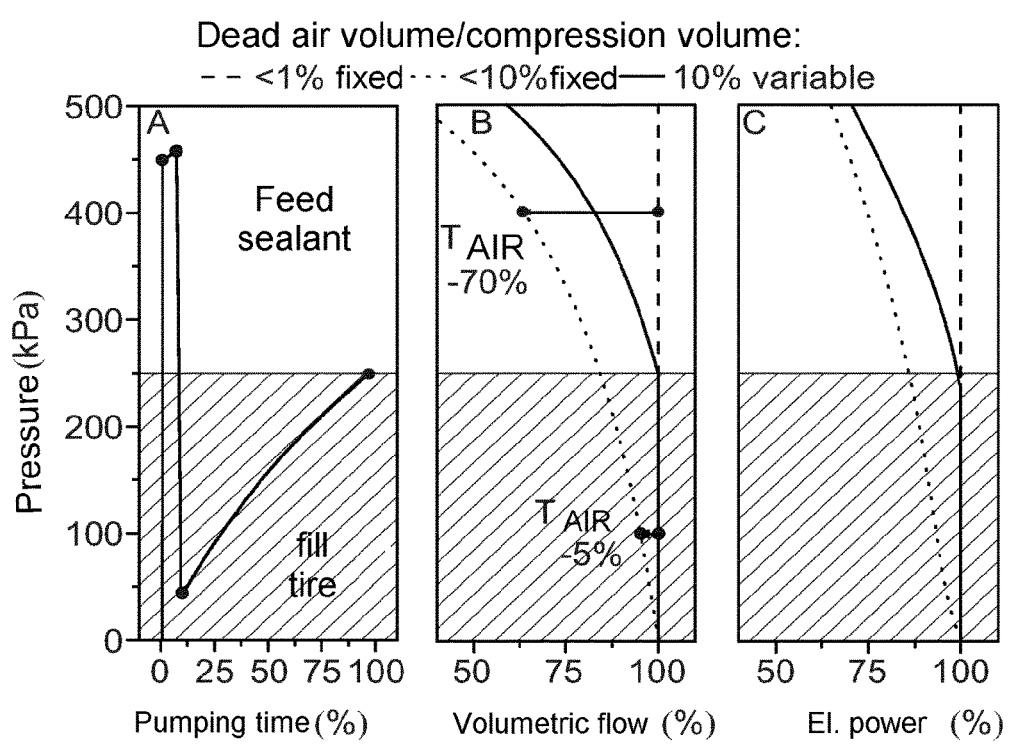

FIG. 2 shows diagrams for a comparison of the operating modes/operating states "inflate" and "feed sealant", the pumping time, volumetric flow and electrical power of the compressor motor being respectively plotted in relation to the compressor pressure.

In the "inflate" operating mode, i.e. in the operating state in which the tire is filled with air (FIG. 2A), the pressure in the compression chamber at the cylinder head is below a pressure/switching pressure $P_0$ of in this case 250 kPa. In this case, the variable dead air volume 9 has not yet been activated and at the upper dead point (OT) there is only a type-dependent minimum dead air volume 8 between the piston 2 and the cylinder 1. A periodic piston movement has the effect that an air stream is transported through the air outlet 3 by way of the outlet valve 7 on the basis of the known principle. In this operating state, the efficiency of the compressor is not impaired.

In the "feed sealant" operating state (FIG. 2B), due to the high viscosity of the sealant to be fed, the pressure in the cylinder head has been increased significantly as compared with the previous state. The pressure in the air outlet therefore increases beyond the switching pressure $P_0$ and opens the displaceably movably arranged piston slide valve 4 against a correspondingly preselected spring pressure of the spring 5. The movement of the piston slide valve 4 has the effect of opening and providing an additional chamber connected to the cylinder, to be specific a pressure chamber 9, the content of which can be varied by the different pressure that is respectively produced by the two operating modes in the compression chamber.

In this case, the piston slide valve 4 and/or the supply line to the slide valve is/are designed such that pressure peaks from the cylinder are damped and do not cause opening of the slide valve. Furthermore, the damping of the piston slide valve 4 is chosen such that the maximum movement frequency of the slide valve is well below the stroke frequency of the piston. This design prevents uncontrolled oscillation of the system.

Frictional sealing rings 14 are arranged here between the inner wall of the second cylinder 13 and the outer circumference of the piston slide valve 4.

The chamber that is then open toward the cylinder, i.e. the pressure chamber 9, serves as a dead air volume for limiting the volumetric flow. With for example a variable dead air volume of 10% of the compression volume, in the present example the volumetric flow can be reduced by up to 40% and the air temperature can be reduced by up to 70% (FIG. 2B). The electrical power consumption of the compressor with the dead air volume activated also decreases by up to 30%.

With the size of this dead air volume 9 and the pressure of the spring 5 on the piston slide valve 4, the reduction of the volumetric flow and the switching pressure $P_0$ can be preselected.

If, after feeding of the sealant, the pressure in the air outlet, and consequently in the compression chamber, drops again below the switching pressure $P_0$, the piston slide valve 4 closes and the compressor returns again to its normal operating state.

LIST OF REFERENCE SIGNS (PART OF THE DESCRIPTION)

1 Cylinder/compression cylinder
2 Piston
3 Air outlet
4 Piston slide valve
5 Spring
6 Adjusting device
7 Outlet valve
8 Minimum dead air volume
9 Variable dead air volume/pressure chamber
10 Reciprocating piston compressor
11 Cylinder head
12 Pressure gage
13 Second cylinder
14 Frictional sealing rings The foregoing description of the embodiments and examples has been provided for purposes of illustration and description. Example embodiments are provided so that this disclosure will be sufficiently thorough, and will convey the scope to those who are skilled in the art. Numerous specific details are set forth such as examples of specific components, devices, and methods, to provide a thorough understanding of embodiments of the disclosure, but are not intended to be exhaustive or to limit the disclosure. It will be appreciated that it is within the scope of the disclosure that individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Also, in some example embodiments, well-known processes, well-known device structures, and well-known technologies are not described in detail. Further, it will be readily apparent to those of skill in the art that in the design, manufacture, and operation of apparatus to achieve that described in the disclosure, variations in apparatus design, construction, condition, erosion of components, and gaps between components may present, for example.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

We claim:

1. A device for sealing and inflating inflatable objects, the device comprising:
   a source of compressed gas;
   a compressor unit, which is formed as a reciprocating piston compressor driven by a slider crank mechanism and has a piston moved in an oscillating manner in a cylinder, wherein the piston and the cylinder delimit a compression chamber and the cylinder is closed on the output side by a cylinder head with an outlet valve;
   a pressure gage;
   a reservoir for an automatic sealant that can be filled into an inflatable object; and,
   a valve-and-distributor unit for the sealant and the compressed gas, which connects the reservoir and the compressor unit and comprises a line that can be connected to the inflatable object, wherein the valve-and-distributor unit allows the device to be operated according to choice in the two operating modes "inflate" and "feed sealant";

wherein the reciprocating piston compressor is provided with a variable dead air volume, the content of which can be varied depending on the respective operating mode.

2. The device as claimed in claim 1, wherein content of the dead air volume can be varied depending on the different pressure that is respectively produced by the two operating modes in the compression chamber.

3. The device as claimed in claim 1, wherein the dead air volume is provided by a pressure chamber which is connected to the compression chamber and the content of which can be varied by the different pressure that is respectively produced by the two operating modes in the compression chamber.

4. The device as claimed in claim 3, wherein the content of the further pressure chamber can be varied against spring force, the spring force being adjustable.

5. The device as claimed in claim 3, wherein the further pressure chamber takes the form of a second cylinder, arranged as a guided displaceably movable piston slide valve acted upon by a spring.

6. The device as claimed in claim 1, wherein the content of the dead air volume or pressure chamber can be increased to at least 5% of the compression chamber.

7. The device as claimed in claim 1, wherein the compressed gas flows from the compression chamber into the pressure chamber in a damped manner, through a pneumatic restrictor.

8. The device as claimed in claim 7, wherein the damping is produced by the piston slide valve being frictionally displaced in the second cylinder, in particular by the piston slide valve being formed with sealing rings that are arranged between the inner wall of the second cylinder and the outer circumference of the piston slide valve and produce a frictional damping during the displacement.

9. The device as claimed in claim 7, wherein the damping is performed such that the maximum movement frequency of the piston slide valve is below the stroke frequency of the piston.

10. The device as claimed in claim 1 as used for sealing and inflating motor vehicle tires.

11. A device for sealing and inflating motor vehicle tires, the device comprising:
   a source of compressed gas;
   a compressor unit, which is formed as a reciprocating piston compressor driven by a slider crank mechanism and has a piston moved in an oscillating manner in a cylinder, wherein the piston and the cylinder delimit a compression chamber and the cylinder is closed on the output side by a cylinder head with an outlet valve;
   a pressure gage;
   a reservoir for an automatic sealant that can be filled into a motor vehicle tire; and,
   a valve-and-distributor unit for the sealant and the compressed gas, which connects the reservoir and the compressor unit and comprises a line that can be connected to the motor vehicle tire, wherein the valve-and-distributor unit allows the device to be operated according to choice in the two operating modes "inflate" and "feed sealant";

wherein the reciprocating piston compressor is provided with a variable dead air volume.

12. The device as claimed in claim 11, wherein the variable dead air volume has a content which can be varied depending on the respective operating mode.

13. The device as claimed in claim 12, wherein content of the dead air volume can be varied depending on the different pressure that is respectively produced by the two operating modes in the compression chamber.

14. The device as claimed in claim 12, wherein the dead air volume is provided by a pressure chamber which is connected to the compression chamber and the content of which can be varied by the different pressure that is respectively produced by the two operating modes in the compression chamber.

15. The device as claimed in claim 14, wherein the content of the further pressure chamber can be varied against spring force, the spring force preferably being adjustable.

16. The device as claimed in claim 14, wherein the further pressure chamber takes the form of a second cylinder, arranged in which is a guided displaceably movable piston slide valve, which is acted upon by a spring.

17. The device as claimed in claim 12, wherein the content of the dead air volume or pressure chamber can be increased to at least 5% of the compression chamber.

18. The device as claimed in claim 16, wherein the compressed gas flows from the compression chamber into the pressure chamber in a damped manner, in particular flows through a pneumatic restrictor.

19. The device as claimed in claim 18, wherein the damping is produced by the piston slide valve being frictionally displaced in the second cylinder, in particular by the piston slide valve being formed with sealing rings that are arranged between the inner wall of the second cylinder and the outer circumference of the piston slide valve and produce a frictional damping during the displacement.

20. The device as claimed in claim 18, wherein the damping is performed such that the maximum movement frequency of the piston slide valve is below the stroke frequency of the piston.

* * * * *